United States Patent [19]
Farmer et al.

[11] Patent Number: 5,907,366
[45] Date of Patent: May 25, 1999

[54] VERTICAL BLANKING INSERTION DEVICE

[75] Inventors: James O. Farmer, Lilburn; Joseph W. Davis, Duluth; Galen Richard Perin, Stone Mountain, all of Ga.

[73] Assignee: Digital Video Systems, Inc., Los Gatos, Calif.

[21] Appl. No.: 08/626,557

[22] Filed: Apr. 2, 1996

[51] Int. Cl.⁶ .................................................. H04N 7/08
[52] U.S. Cl. ............................ 348/478; 348/6; 348/473
[58] Field of Search .................................. 348/6, 7, 9, 12, 348/13, 473, 478; 455/4.2, 5.1, 6.1; H04N 7/08

[56] References Cited

U.S. PATENT DOCUMENTS

| | | | |
|---|---|---|---|
| 4,547,804 | 10/1985 | Greenberg | 348/473 |
| 5,200,822 | 4/1993 | Bronfin et al. | 348/473 |
| 5,285,272 | 2/1994 | Bradley et al. | 348/473 |
| 5,343,239 | 8/1994 | Lappington et al. | 348/478 |
| 5,438,370 | 8/1995 | Primiano et al. | 348/478 |
| 5,493,339 | 2/1996 | Birch et al. | 348/478 |
| 5,555,025 | 9/1996 | McArthur | 348/478 |
| 5,600,366 | 2/1997 | Schulman | 348/9 |
| 5,604,542 | 2/1997 | Dedrick | 348/478 |
| 5,652,615 | 7/1997 | Bryant et al. | 348/9 |
| 5,699,124 | 12/1997 | Nuber et al. | 348/478 |

OTHER PUBLICATIONS

LSI Logic Corporation, Product Specification of Chip No. L64002; pp. 1–24, 2–25 through 2–27; ©1995.

*Primary Examiner*—Richard Lee
*Attorney, Agent, or Firm*—Sawyer & Associates

[57] ABSTRACT

A method and device for inserting data onto one or more lines of one or more vertical blanking intervals of a television video signal, and in particular a television signal conforming to the NTSC (National Television Standards Committee) format.

8 Claims, 9 Drawing Sheets

VERTICAL BLANKING INSERTION DEVICE

BACKGROUND OF THE INVENTION a. Field of the Invention

The present invention concerns a method for inserting data onto one or more vertical blanking interval lines (or VBI lines) of a television video signal, and in particular, for inserting data (such as non-video data) onto one or more VBI lines of a television video signal conforming to the NTSC (National Television Standards Committee) format. The present invention also concerns a device for implementing this method.

b. Related Art

Vertical blanking intervals of video signals conforming to the NTSC format have been used for carrying inserted data, such as closed captioning data for example. Although the NTSC format is well known in the art, a brief description of its salient aspects is described with reference to FIGS. 1, 2, 5a and 5b. A color video signal must convey luminance, hue, and saturation information. Luminance information is perceived as brightness, hue is perceived as color and saturation is perceived as color purity. The NTSC standard facilitates recording, transmitting, and playing back this information.

The NTSC standard provides 525 horizontal lines of video. The television receiver "scans" the horizontal lines onto its screen, from left to right. After the scanning of each horizontal line, the scanner requires a small time period to reposition itself at the left of the next horizontal line. This is known as horizontal retrace. A sequence of horizontal lines is scanned from the top of the screen to the bottom of the screen. Each image frame consists of two interleaved fields. As shown in FIG. 2, the two interleaved fields consist of a field of odd horizontal lines 201, and a field of even horizontal lines 202. Each of the fields consists of 262 or 263 horizontal lines. At the end of a field, the scanner requires a period of time to reposition itself to the left of the first horizontal line of the next field. This is known as vertical retrace.

FIG. 1 depicts a waveform for one field or one half of one frame. The waveform includes four components; namely, the picture waveform, horizontal and vertical blanking pulses, synchronizing pulses, and equalizing pulses. For about the first 240 horizontal lines of the field, each line of the waveform includes a horizontal synchronization pulse superimposed on a horizontal blanking pulse, which is followed by a picture component. The horizontal blanking pulse consists of about 14% to 18% of each line and causes a dark output during the horizontal retrace time. The horizontal synchronizing pulse is superimposed on the blanking pulse and is used to maintain the timing of the picture tube scanning. The horizontal synchronizing pulse is defined by the leading edge of the pulse. The picture waveform includes signal variations which correspond to variations in the brightness (or luminance) of the picture. The luminance signal ($E_y'$) is based on the relative sensitivity of the human eye to primary colors (i.e., red, green, and blue). The picture waveform defines the so-called "active period" of each scanning line. If the amplitude of the signal is 100% for synchronizing pulses, the amplitude of the picture signal will be between 7.5% (representing white) and 70.0% (representing black) of the amplitude of the synchronizing pulses.

The remaining of the 263 horizontal lines of the field (i.e., horizontal lines 241–263) occur during the vertical blanking interval (or vertical blanking period) which constitutes about 7.5% of the vertical scanning interval. The vertical retrace of the scanner occurs during the vertical blanking interval. As shown in FIG. 1, the first 9 or 10 lines of the vertical blanking period include equalizing pulses and vertical synchronization pulses. The equalizing pulses prevent the pairing of interlaced lines on the picture tube. Specifically, for odd-numbered fields, the leading edges of the vertical synchronization pulses coincide with the horizontal synchronization pulses, while for even-numbered fields, the leading edges of the vertical synchronization pulses do not coincide with the horizontal synchronization pulses.

FIG. 5a illustrates two lines of chrominance information superimposed on two lines of the luminance signal (see, e.g., period V—V of FIG. 1). The hue is determined by the phase of the subcarrier, and the saturation is determined by the amplitude of the subcarrier. As shown in FIG. 5a, and in greater detail in FIG. 5b, a "color burst" consisting of a train of sine waves is placed on the "back porch" of the horizontal blanking pulse at the start of a new line. The phase of the subcarrier, and thus the hue, is determined with respect to the sine waves forming the "color burst."

Lastly, NTSC standard specifies a transmission rate of 29.97 frames per second, an aspect ratio (i.e., the ratio of image width to image height) of 4/3 and a horizontal resolution of 340. Since there are 525 lines per frame, 15,734 lines are must be scanned per second. The subcarrier frequency of the chrominance signal is 3.579545 MHz.

FIG. 3 illustrates the format of a closed caption waveform 300. The temporal length of the closed caption waveform 300 is approximately 2 ms. As shown in FIG. 3, the closed caption waveform 300 includes seven (7) cycles of a sine wave 310, a low bit, a low bit, and a high bit (or a "0-0-1" sequence) 320, and a two (2) byte payload section 330. The two (2) byte payload section 330 includes the closed caption data. In the NTSC format, close caption waveform 300 is inserted on the $21^{st}$ line of one or more vertical blanking intervals of the first field of one or more frames.

A suitably equipped television receiver (hereinafter referred to as a "closed caption compatible television receiver") includes a means for stripping the closed caption waveform 300 from a received NTSC video signal, a means for decoding information contained in the closed caption waveform 300, and a means for providing a display of the decoded closed caption information.

The seven (7) cycles of a sine wave 310 allow a closed caption compatible television receiver to lock onto the phase of the closed caption waveform 300. By locking onto the phase of the closed caption waveform 300, the television receiver can read each of the sixteen (16) bits of data in the two (2) byte payload section 330 in the middle of the bit, away from any rising or falling edges. The 0-0-1 sequence 320 indicates that the two (2) byte payload section 330 will follow. The two (2) byte payload section includes textual information to be displayed on a portion of the video output of the television receiver. Since each closed caption waveform 300 includes only two (2) bytes of data, a series of closed caption waveforms 300 must be inserted on the first field of each of a sequence of video frames. Typically, this textual information permits deaf and hearing impaired television viewers to follow the dialog of a television program.

LSI Logic Corp. provides an MPEG-2 Audio/Video Decoder, model no. 64002, which includes registers for inserting data onto a vertical blanking interval. Data stored in these registers may be used for closed caption data and for VITS (Vertical Integral Test Signal). The registers include two (2)-eight (8) bit registers for storing the address of luma (luminance) data to be output during the vertical blanking interval and two (2)-eight (8) bit registers for storing the address of chroma (chrominance) data to be output during the vertical blanking interval. However, the origin of the address to be stored in the registers is not identified. Moreover, the registers are described as storing addresses, not data.

In view of the limited types of data inserted on the vertical blanking interval of a video signal in the known systems, inserting other data, such as non-video data, and in particular, textual data, onto the vertical blanking intervals of the NTSC formatted video signal may be desired. For example, advertisers (sponsors) may want to verify that their advertisement (commercial) was successfully transmitted, in its entirety, on a particular channel at a particular time.

Historically, video programming has been provided by local television stations which transmit analog signals to the homes of viewers within the transmission region of the local television stations. Such video programming has been either publicly funded (e.g., PBS) or privately funded by sponsors (e.g., firms, public interest groups, politicians) wishing to convey an advertisement to potential viewers of the video programming.

Over the past decade or two, "off-the-air" analog communication systems, such as cable television (CTV) systems for example, have become common. In cable television systems, a number of channels are frequency multiplexed and transmitted onto a coaxial cable distribution network. Due to the limited bandwidth of the coaxial cable, only about 50 to 70 analog video channels can be simultaneously carried over an appreciable distance without undue signal attenuation. A set-top box at a subscriber's home decodes a selected channel from among the channels frequency multiplexed on the coaxial cable entering the set-top box. The programming on these channels may be publicly funded and/or privately funded, and in each case, the funding may be supplemented by money paid by subscribers of the cable television service.

In the past few years, digital satellite systems have entered the market for providing video programming to individual consumers. Although digital transmission and compression permit a large number of channels to be transmitted a relatively great distance without signal degradation, each subscriber needs specialized and relatively expensive satellite receivers, digital decoders and decompressors. As with cable television (CTV) systems, the programming on these channels may be publicly funded and/or privately funded, and in each case, the funding may be supplemented by money paid by the subscribers of the satellite video programming service.

In each of the above systems, advertisers (sponsors) may, and often do, substantially subsidize the costs of providing video programming. In return, the advertisers are able to convey their message to a relatively large potential audience. The advertisements (commercials) may be run nationally or at the local level. Although nationally run advertisements have the potential of reaching the largest audience, they are relatively expensive and inherently not targeted to a particular geographic region. On the other hand, locally inserted advertisements are relatively inexpensive and have the potential of reaching a more specifically defined geographic audience.

The following provides an example of the insertion of a local advertisement on a network program (national) video feed received at a local station. Conventional subscriber systems, such as cable television (CTV) systems, are typically arranged to provide viewer programs according to a predetermined time schedule. The programs available to the subscribers of a particular system are usually provided by a national network source and transmitted, via a satellite link for example, to the head-end of a local cable television distribution system. The national network programmers provide certain intervals (i.e., designated breaks) during each program. The local cable provider can provide content (e.g., local advertisement(s)) during these designated breaks. For example, approximately four minutes are commonly set aside in each half-hour of national network programming to permit local insertion of commercial advertisements that may be particularly targeted and relevant to the local subscribers of the cable television (CTV) system.

The time of each break is generally indicated by a "cuetone" signal which is delivered as a part of the national network feed signal. The types of cuetone signals that may be transmitted in the national network program feed include: i) a pre-roll period signal which allows a video tape player, loaded with a video tape having a local advertisement, to attain operating speed and to advance the video tape to the start of the advertisement; (ii) a transfer-to-ad signal which indicates the start of the advertisement transmission interval; and (iii) a return signal which indicates a return to the national network program source transmission. The cuetones are formatted as standard dual-tone multi-frequency (DTMF) signals. A local program programmer may substitute local advertisements in the place of national advertisements during the designated breaks indicated by the cuetone signals.

Two possible operational sequences of advertisement insertion are briefly discussed below. In a first operation sequence, a series of cuetone signals detected by a cuetone detector serve as inputs to a controller. In response to a pre-roll cuetone signal, the controller activates a local video tape player, which has mounted thereon, a video tape containing the desired advertisements. When the controller receives the transfer-to-ad cuetone signal, it commands switching equipment to switch the subscriber system from the incoming national network program video and audio signals to the output of the local video tape player for the duration of the advertisement. Finally, when the controller receives the return cue tone signal, it commands the switching equipment to return the subscriber system to the incoming national network feed.

In a second operational sequence of the advertisement insertion, only the pre-roll cuetone signal is required. In this instance, the local cable programmer knows that, for the given cable channel, the pre-roll time is a fixed interval and that each break is of a fixed duration. When the controller receives the pre-roll cuetone signal, immediately following the fixed interval, the switching equipment switches to the local advertisement. At the end of the fixed duration break, the switching equipment switches the subscriber system back to the national network feed. Thus, in this example, transfer-to-ad and return cuetone signals are not required.

In any of the above mentioned systems, an advertiser (sponsor) will want to verify that its advertisement was properly stored, retrieved, switched to, and transmitted on the appropriate channel at the appropriate time. Moreover, the advertiser will want to ensure that the commercial ran in its entirety. Although such verification is important for advertisements inserted nationally as well as locally, the verification of locally inserted advertisements can be more complex since the number of local markets can be large.

As discussed above, cable television (CTV) systems, for example, permit advertisements to be inserted locally.

Again, typically, cuetones in a national network program feed are used to signal when an advertisement is to be inserted. Specifically, based on cuetones, a switch having inputs provided with a national network program signal and a local advertisement signal, will output one of these signals for transmission onto a channel of the coaxial cable distribution network.

The prior art does not provide a method or device for verifying that a commercial was properly transmitted, in its entirety, on an appropriate channel of a coaxial cable distribution network at an appropriate time. Therefore, a need exists for such a verification method or device.

SUMMARY OF THE INVENTION

The present invention meets the above mentioned need by providing a method for inserting private data on at least one line of a vertical blanking interval of a video signal. The method includes steps of (i) providing the private data on an MPEG transport stream, (ii) separating the MPEG transport stream into elementary streams based on packetized identification numbers which uniquely identify the elementary stream as a type of elementary stream, (iii) extracting the private data from an elementary stream of the MPEG transport stream, (iv) determining a time of the at least one line of the vertical blanking interval of the video signal, and (v) inserting the extracted private data onto the video signal during the determined time.

In a specific methodology of the present invention, the private data on the MPEG transport stream is included on a private data packet. This private data is buffered after the MPEG transport stream is separated into the elementary streams. In a preferred methodology of the present invention, the private data is extracted from the MPEG transport stream by reading out the buffered private data. The private data is then inserted onto the video signal by (i) formatting the private data for recognition by a decoder, (ii) providing the private data to a video encoder during the determined time, and (iii) providing a video signal, derived from a video elementary stream of the MPEG transport stream, to the video encoder during times other than the determined time.

In a specific methodology of the present invention, the data is formatted by concatenating a frame count number to the data included on the private data packet. The frame count number is determined based on a count of vertical synchronization pulses of the video signal.

In a further refinement of the methodology of the present invention, the time of the at least one line of the vertical blanking interval is determined by (i) determining a time of a vertical synchronization pulse and (ii) counting horizontal synchronization pulses from the time of the vertical synchronization pulse.

In another methodology of the present invention, the private data is provided on the MPEG transport stream on an extension and user video bitstream element of a video elementary stream. The video elementary stream is then provided to a MPEG video decoder. The MPEG video decoder searches for an extension and user video bitstream in the video elementary stream. If the extension and user video bitstream is found in the video elementary stream, (i) the private data is stripped from the extension and user video bitstream, (ii) the private data is formatted into a closed caption format, and (iii) the private data, as formatted, is provided to a video encoder.

The present invention also meets the above mentioned need by providing a device for extracting private data from an MPEG transport stream and inserting the private data on at least one line of a vertical blanking interval of a video signal. The device includes a processor operating under a stored control program, a bus coupled with the processor, a buffer, a transport demultiplexer, an MPEG decoder, a video encoder, a vertical blanking interval data generator, and a multiplexer controller.

The buffer has an input receiving the MPEG transport stream and an output.

The transport demultiplexer has an input coupled with the output of the buffer, an input/output port coupled with the bus, an associated storage device having a plurality of queues, and an output. The transport demultiplexer (i) separates the MPEG transport stream into elementary streams based on packetized identification numbers included in headers of the elementary streams, (ii) routes the elementary streams to the plurality of queues based on the packetized identification numbers, and (iii) provides video elementary streams to its output.

The MPEG video decoder has an input coupled with the output of the transport demultiplexer, an input/output port coupled with the bus, an associated storage device for storing frames of the video elementary stream, and an output. The MPEG video decoder (i) converts the MPEG video elementary streams to a digital video signal, and (ii) provides the digital video signal to its output.

The multiplexer has a first input coupled with the output of the MPEG video decoder, a second input, a control input, and an output.

The video encoder (e.g., an NTSC video encoder) has a first input coupled with the output of the multiplexer, a second input provided with video synchronization pulses, a first output, and a second output. The video encoder (i) encodes a digital video signal provided at its first input to a formatted video signal based on the video synchronization pulses provided at its second input, (ii) converts the formatted video signal into an analog video signal, (iii) provides the analog video signal to its first output, (iv) determines the start of a field, (v) determines a count indicative of a horizontal line of a video field of a video frame of the analog video signal, and (vi) provides signal(s), based on the start of a field and the count, to its second output.

The vertical blanking interval data generator has a port coupled with the bus, and an output coupled with the second input of the multiplexer. The vertical blanking interval data generator (i) formats data provided at its port to form formatted data, and (ii) provides the formatted data to its output. The multiplexer controller has an input coupled with the second output of the video encoder, and an output coupled with the control input of the multiplexer. The multiplexer controller (i) determines an occurrence of the at least one line of a vertical blanking interval of the analog signal based on data provided at its input and (ii) provides a switching signal to the multiplexer based on the determined occurrence of the at least one line of the vertical blanking interval.

In a preferred embodiment of the present invention, each of the plurality of queues of the storage device of the transport demultiplexer has an associated pointer. The processor is programmed to (i) check the location of the pointer of one of the queues at least two times to determine if new data has been stored in the one of the plurality of queues, (ii) extract the new data from the queue if new data has been determined to exist, and (iii) provide the new data extracted from the queue to the port of the vertical blanking interval data generator, via the bus. The formatted data formed by the vertical blanking interval data generator includes a code which identifies a particular commercial and a frame count number.

In another embodiment of the present invention, the video decoder is programmed to (i) search for an extension and user video bitstream element in the video elementary stream and (ii) inform the processor if an extension and user video bitstream element is found. If the processor is informed that an extension and user video bitstream element is found, the processor is programmed to provide data contained within the extension and user video bitstream element to the vertical blanking interval data generator. In a refined embodiment of the present invention, the data is closed captioning data.

In a preferred embodiment of the present invention, the video encoder includes a register for storing data to be inserted on one line (e.g., the $21^{st}$ line) of the vertical blanking interval during a first field of a frame of the video signal.

BRIEF DESCRIPTION OF THE DRAWINGS

FIG. 5b is an enlarged view of the horizontal synch pulse and color burst of the lines of FIG. 5a.

FIG. 6b is a block diagram which illustrates a video encoder used by the playback card of FIG. 6a.

DETAILED DESCRIPTION

Figure 4:
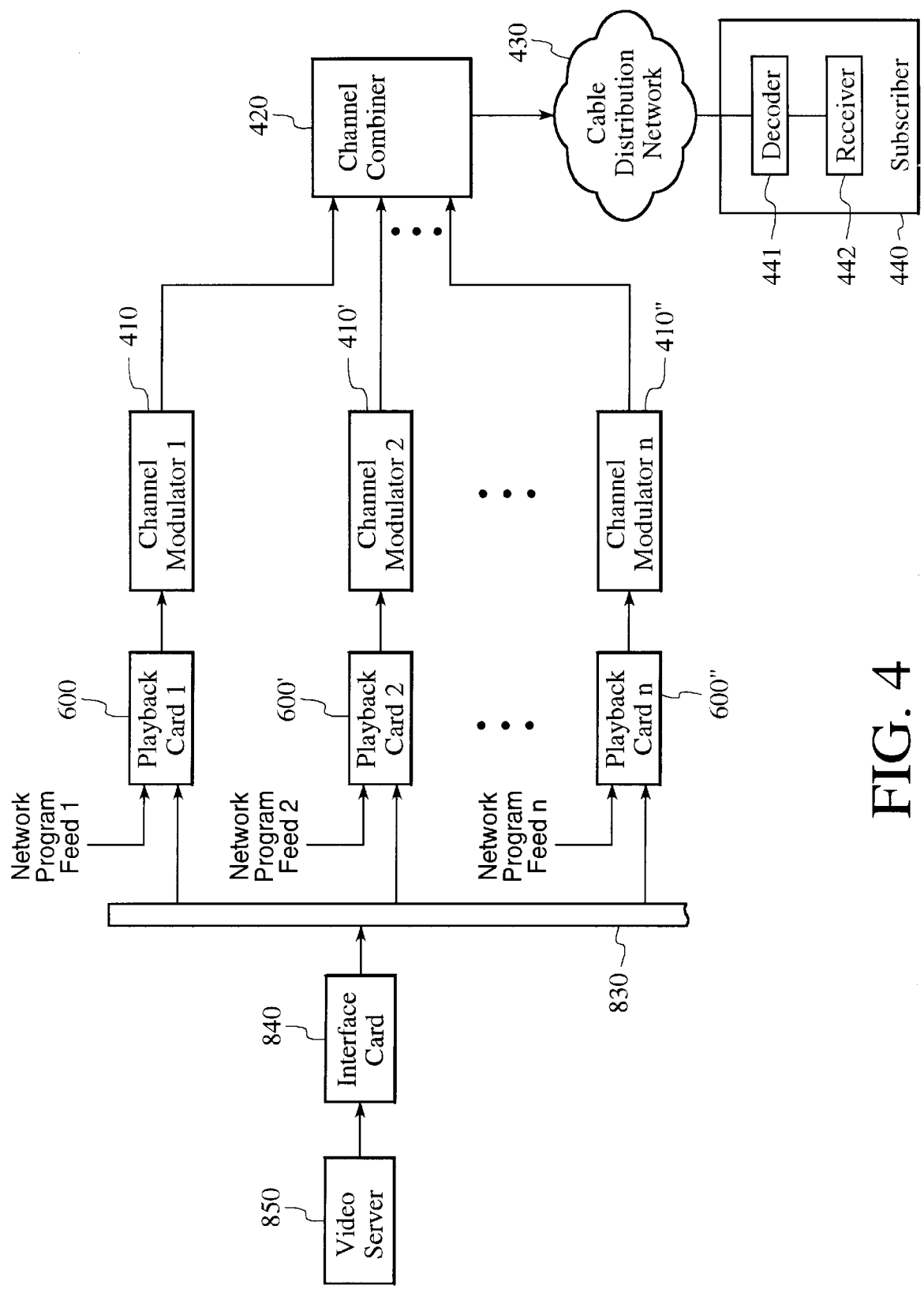
FIG. 4 illustrates a cable head-end station and distribution network in accordance with the present invention.
Figure 6A:
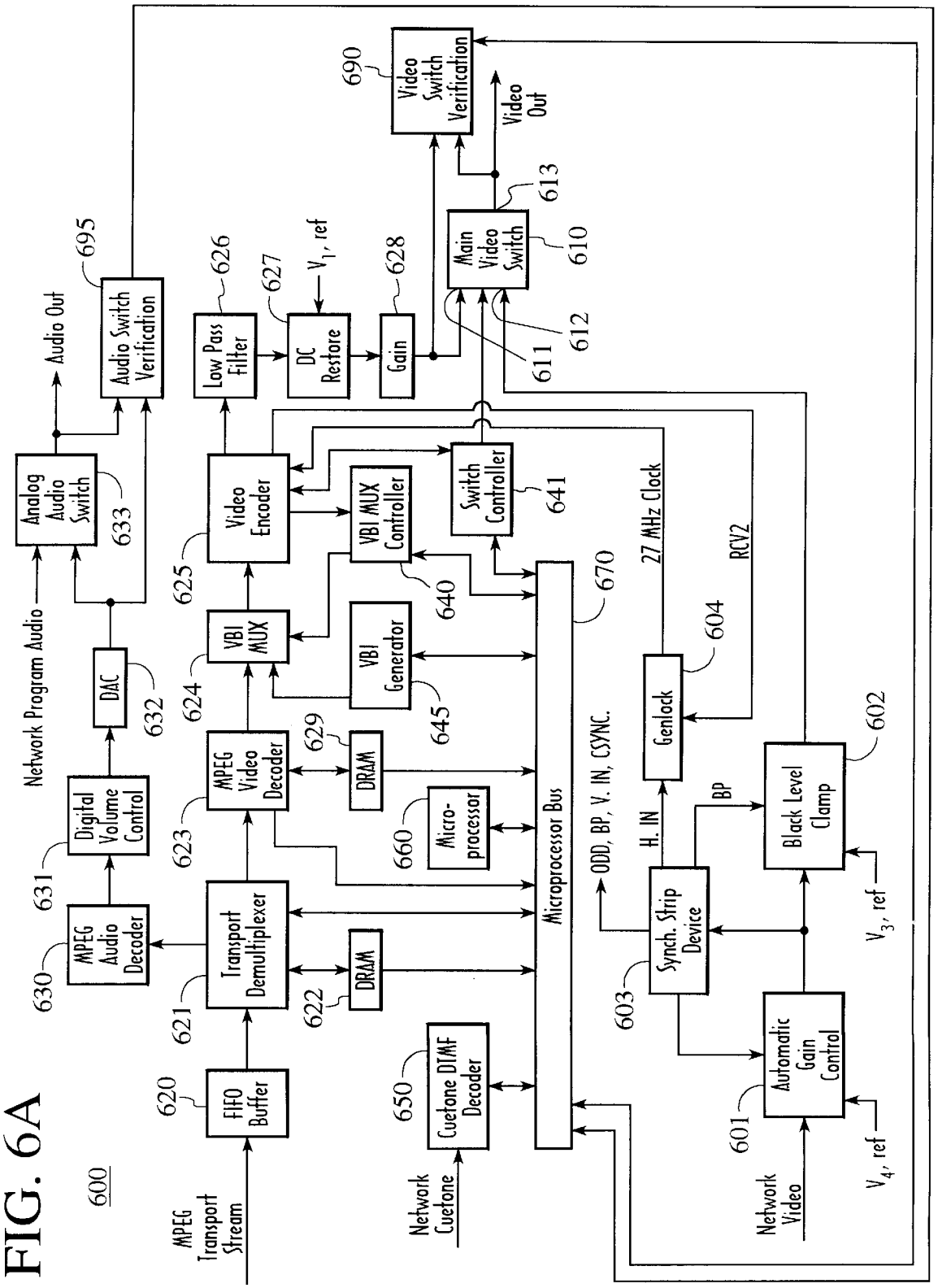
FIG. 6a is a block diagram which illustrates a playback card included in the cable-head end station of the present invention shown in FIG. 4 and facilitating the insertion of closed captioning data, private data, and ad verification data onto a vertical blanking interval of a video signal formatted in accordance with NTSC.

FIG. 6a is a block diagram which illustrates a playback card 600 in which the vertical blanking insertion device of the present invention may be employed. FIG. 4 is a block diagram which shows the use of the playback card 600 in an advertisement insertion system. As shown in FIG. 4, the output of the playback card 600 is provided to a channel modulator 410 which delivers a single, narrow-band analog signal serving as one of many input channels which are combined by channel combiner 420 to form a broadband signal spectrum injected onto the coaxial cable distribution network 430 by a local cable provider.

The playback card 600 shown in FIG. 6a may be used at a local cable "head-end" location for: (i) conditioning a received network program analog video signal for modulation and transmission over the coaxial cable distribution network 430; (ii) decoding, decompressing, converting from digital to analog, and formatting to the NTSC standard, a MPEG (Motion Picture Experts Group) encoded commercial video signal; (iii) inserting data during the vertical blanking intervals of the commercial video signal; (iv) synchronizing the received network program analog video signal and the commercial video signal; and (v) selecting an appropriate one of the conditioned network program and commercial video signals for modulation and transmission over the coaxial cable distribution network 430.

Figure 5A:
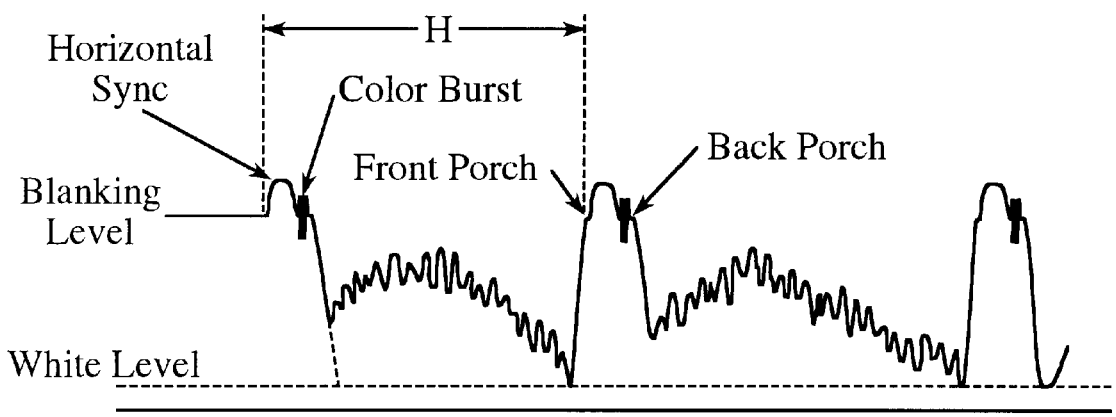
FIG. 5a shows two lines of chrominance information superimposed on a luminance signal.
Figure 5B:
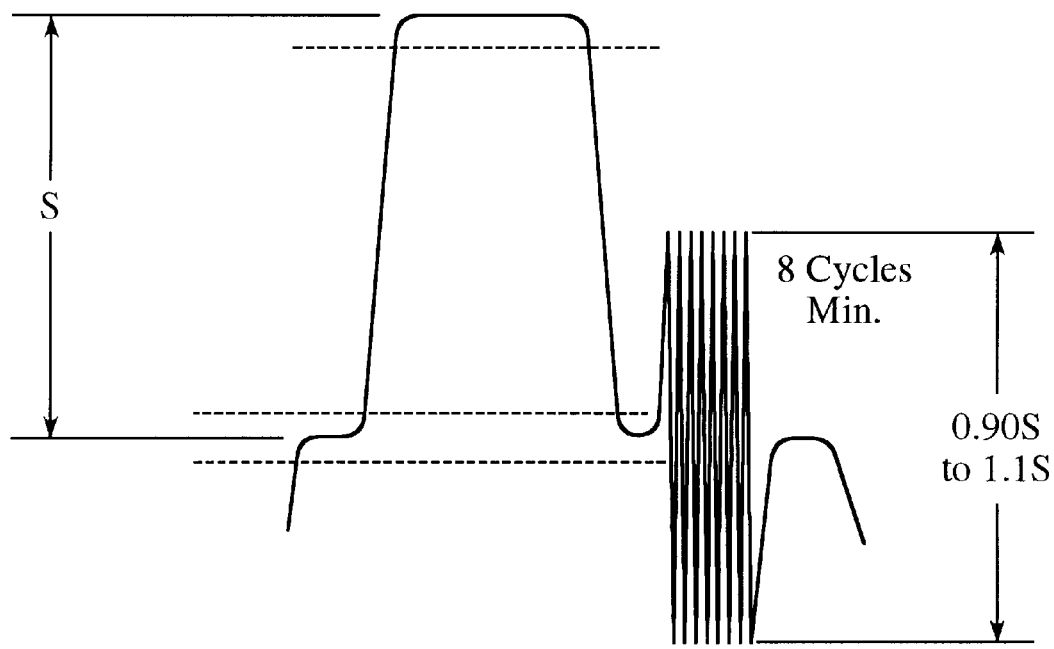

The playback card 600 conditions a received network program analog video signal for modulation and transmission over the coaxial cable distribution network 430 as follows. The received network program video signal is applied to an automatic gain control device 601 which restores the amplitude of the received network program video signal to a predetermined value, if the signal is attenuated, based on a reference voltage $V_{4,ref}$ and based on a feedback signal. The feedback signal is provided by the sync strip device 603 which removes (or "strips") horizontal and vertical synchronization (or "sync") signals of the network video signal and generates a back porch signal (BP) which indicates when the back porch of the signal occurs. As is well known in the art and as is illustrated in FIG. 5a, the back porch of a video signal is an interval of a video waveform between the end of a horizontal synchronization pulse and the beginning of active video information. The output of the automatic gain control device 601 is also applied to a black level clamp device 602 which clamps the black level voltage of the program video signal to a predetermined voltage (e.g., zero volts) by using the back porch signal (BP) from the network program video signal provided by the sync strip device 603 and a reference voltage $V_{3,ref}$. The output of the black level clamp device 602 is applied to an input 612 of the main video switch 610.

As shown in FIG. 6a, the synch strip device 603 provides the horizontal sync pulses H_IN of the network video signal to a genlock device 604. The genlock device 604 generates a 27 MHz clock in synchronization with the horizontal sync pulses H_IN.

Figure 8:
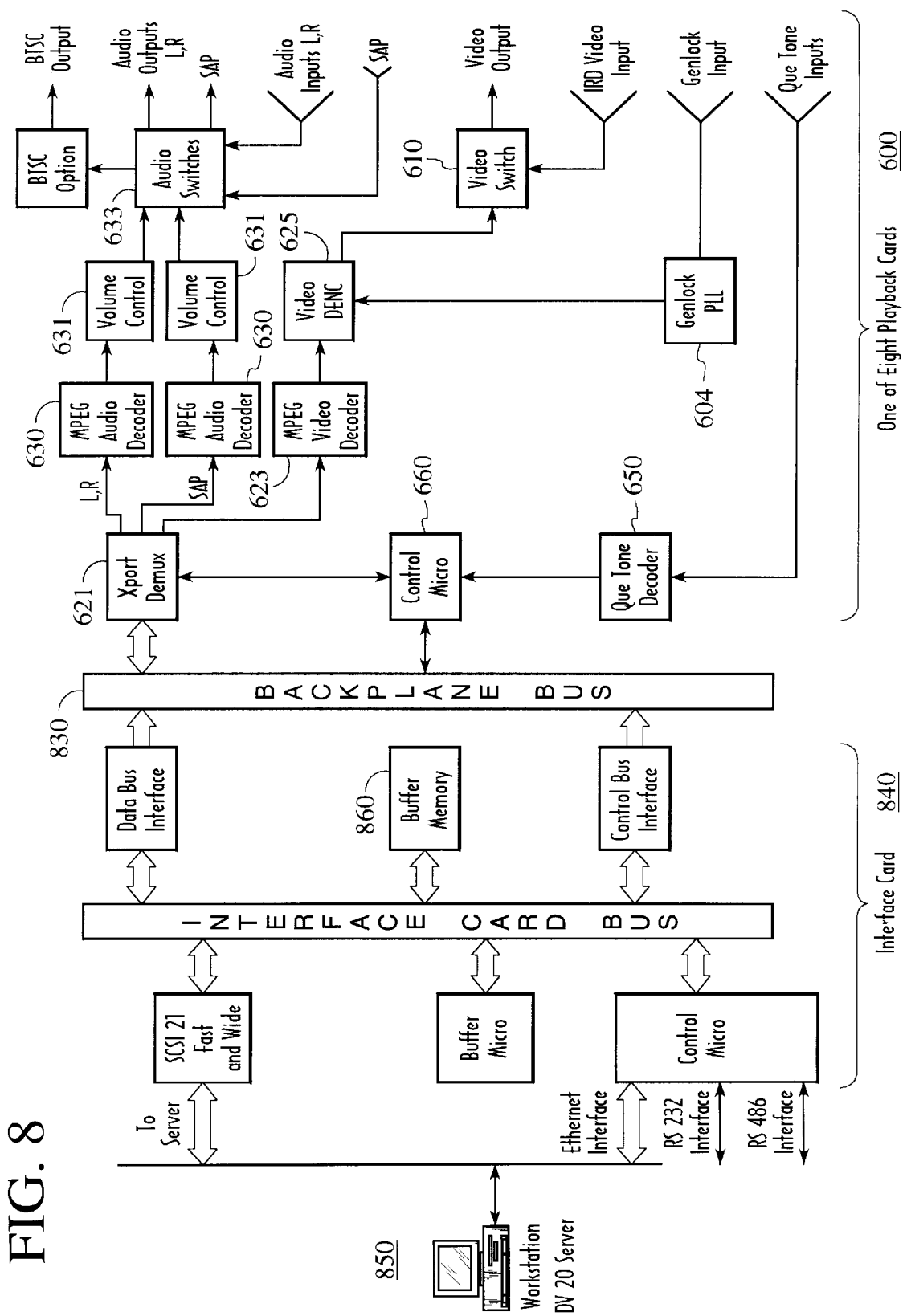
FIG. 8 is a block diagram of a system, such as the cable-head end station of FIG. 4, in which the vertical blanking insertion device and playback card of the present invention may be used.

The video playback card 600 also decodes, decompresses, converts from digital to analog, and formats in the NTSC standard, a MPEG encoded commercial signal as follows. As shown in FIG. 6a, an MPEG encoded commercial signal is received at a FIFO (first-in, first-out) buffer 620 as an MPEG transport stream. The MPEG encoded commercial signal is a digital signal which, as shown in FIGS. 4 and 8, may be stored and retrieved by a digital file server 850 located at the cable head-end station. The digital file server 850 exploits the benefits of digital storage and high-speed digital transmission, including such benefits as efficient use of bandwidth and error-correction capabilities. Thus, the digital file server 850 replaces video tape players associated with conventional analog storage, retrieval and transmission systems.

The digital file server 850 stores the commercial advertisement data in digital form, rather than analog, in low-cost, high capacity digital memory. To optimize the use of the digital memory, the commercial advertisement data is typically compressed according to a data compression algorithm, such as the MPEG (Motion Pictures Expert Group) algorithm for example. When insertion of a particular commercial advertisement is desired, that advertisement must be located in memory, retrieved, decompressed, and converted to an appropriately formatted analog signal for transmission over a channel of the coaxial cable distribution network 430. The MPEG encoded commercial signal may be routed, via an interface card 840, to an appropriate one of a plurality of playback cards 600 (i.e., the one of the plurality of playback cards corresponding to the channel upon which the advertisement is to be inserted), via a backplane bus 830.

The transmission of the commercial signal may be bursty, i.e., it may comprise short "bursts" of high speed data. Thus, the FIFO buffer 620 is employed to slow the data rate of the bursts of received commercial video signal. However, on average, the rate of data provided from the FIFO buffer 620 may be the same as the rate of data provided to the FIFO buffer 620.

As shown in FIG. 6a, the data output from the FIFO buffer 620 is provided to a transport demultiplexer 621, which may comprise a programmable RISC (Reduced Instruction Set Computer) microprocessor for example (e.g., a CL9110 chip manufactured by C-Cube Microsystems). The transport demultiplexer 621 separates the incoming commercial signal (i.e., the transport stream) into MPEG elementary data streams (i.e., one of coded video, coded audio, or other coded bitstreams in packetized elementary stream packets with a unique stream identifier) representative of audio and video information and removes transport header information. The separated data streams may be temporarily stored in the transport demultiplexer 621 or in the storage device 622 (e.g., a DRAM) associated with the transport demultiplexer 621. More specifically, the MPEG transport stream is characterized by a MPEG packet having a transport header and a payload portion, i.e., an elementary data stream. The transport demultiplexer 621 parses the MPEG packet to obtain header information and routes the payload to its storage. The header section also includes a packetized identification (or PID) number to indicate the type of information (e.g., audio, video, secondary audio, or private data) contained in the payload. The payload is stored in different areas of the memory 622 of the transport demultiplexer 621 based on the type of information in the payload.

More specifically, the memory 622 of the transport demultiplexer 621 is divided into sixteen (16) queues, numbered "0" through "15", each of which is a circular (or ring) buffer associated with a particular packetized identification (PID) number. For example, the "0" queue is associated with video packets, the "1" queue is associated with audio packets, the "2" queue is associated with secondary audio program (or SAP) packets, and the "3" queue is associated with private data packets. The remaining queues are user definable.

In a preferred embodiment, the transport demultiplexer 621 is a programmable RISC chip manufactured by C-Cube Corporation and indicated as part number CL9110 as discussed above. This transport demultiplexer 621 has two (2) dedicated hardware ports for the video and audio packets. These hardware ports are provided for video packets, for example, because the high bandwidth of the video data would otherwise fill (and overflow from) the circular buffer of the "0" queue. The contents of the other queues ("2" through "15") may be accessed by the microprocessor 660. For example, the microprocessor 660 may be programmed to check the location of the pointer of the circular buffer associated with a queue to see if the pointer has moved. If the pointer is determined to have moved, the microprocessor 660 determines that new data is available in that particular circular buffer or queue.

The processing of the audio signals is briefly discussed below. The audio components of the MPEG transport stream are provided to a MPEG audio decoder 630 via one of the dedicated hardware ports of the transport demultiplexer 621. Secondary audio program (SAP) components in the MPEG transport stream are (i) buffered in the "2" queue, (ii) read out by microprocessor 660, and (iii) provided, via a secondary audio program interface device (not shown) to the MPEG audio decoder 630. The MPEG audio decoder 630 provides left, right and SAP digital audio signals. The volume of the left and right digital audio signals may be adjusted by the digital volume control 631 and then converted to analog by the digital-to-analog converter 632. The analog left and right audio signals, as well as the SAP audio signal, are provided to a first set of inputs of the analog audio switch 633. Network program audio signals are provided to a second set of inputs of the analog audio switch 633.

The video component of the MPEG transport stream is provided to a MPEG video decoder 623 via the other of the dedicated hardware ports of the transport demultiplexer 621.

The MPEG video decoder 623 may be a standard chip (e.g., the STi3500A by SGS-Thompson Micro Electronics) and decodes and decompresses the MPEG video signal. A DRAM (dynamic random access memory) 629 may be provided for buffering incoming data before decoding by the MPEG video decoder 623. Specifically, the MPEG video decoder 623 may require two (2) video frames (prior and future) to decode the MPEG encoded video signal (assuming predictive encoding was used).

A storage algorithm may be used which, upon the receipt of a pre-roll cue tone signal: (i) loads the memory 629 (e.g., a DRAM) of the MPEG video decoder 623 with MPEG video data; (ii) then, when the memory 629 of the MPEG video decoder 623 is full, loads the memory 622 of the transport demultiplexer 621 with MPEG data; and (iii) then, when both the memories 622 and 629 are full, loads the buffer memory 860 of the interface card 840 (See FIG. 8). This storage algorithm permits the MPEG data, needed to generate the analog version of the advertisement, to be distributed in memory throughout the system such that local analog generation can be carried out in a timely manner for immediate substitution of the local advertisement for the network video signal during the break interval. Such distributed buffering ensures that MPEG video data is available to the video encoder 625 when needed and prevents the loss of video data due to memory overflow.

The decoded digital video signal output by the MPEG video decoder 623 is provided to a vertical blanking interval (or VBI) multiplexer 624. The VBI multiplexer 624 permits data (including non-video data such as the "private" type of MPEG data mentioned above) to be provided to the video encoder 625 during vertical blanking intervals (described above) of the decoded video signal output by the MPEG decoder 623 as encoded by video encoder 625 (Note that the vertical blanking intervals are defined by the video encoder 625 and are not provided in the digital video signal output by the MPEG video decoder 623). The VBI multiplexer 624 is controlled by a Vertical Blanking Interval (or "VBI") multiplexer controller 640. The VBI multiplexer controller 640 may use horizontal and vertical counts from the video encoder 625 (or sync pulses H_IN and V_IN from the sync strip device 603), for example, to determine when each line of a vertical blanking interval will occur. The multiplexed signal output by the multiplexer 624 is then applied to the video encoder 625.

The video encoder 625 may be a off-the-shelf chip (such as the SAA7185A chip by Phillips Semiconductors, for example) and functions to: (i) insert vertical and horizontal synchronization pulses onto the video signal by means of the horizontal and vertical counters 6251 and 6252, respectively, and logic 6253; and (ii) convert the digital video signal to an analog video signal by means of the digital to analog converter 6256. Specifically, the MPEG video elementary stream delivers the equivalent of red, green, and blue components as three individual, time multiplexed, components which appear serially onto a data bus. The MPEG video elementary stream does not include synchronization or equalization pulses, or blanking pulses. As discussed above, the video signal, in accordance with the NTSC standard, is a composite video signal of the chrominance and luminance information for transmission over a single wire.

A 27 MHz clock applied to the video encoder 625 is synchronized with that of the network program (national) analog video signal by means of the Genlock phase lock loop device 604. Each 27 MHz clock pulse increments the horizontal counter 6251. When the count of the horizontal counter reaches 1716 (i.e., the number of 27 MHz cycles per scan line) it is reset and the count of the vertical counter 6252 is incremented by one. The count of the vertical counter 6252 is reset when a vertical synchronization pulse is received (or when its count reaches 525). The outputs of the horizontal and vertical counters 6251 and 6252, respectively, are applied to logic 6253 which generates the required composite synchronization signal CSYNC and color (i.e., chrominance) subcarrier signal SC. Although the logic 6253 is shown within the video encoder 625, it may be located elsewhere within the playback card 600.

The SAA7185A video encoder 625 includes a four (4) byte buffer (not shown). The video encoder 625 can be commanded to insert the first two (2) bytes onto the $21^{st}$ line of the vertical blanking interval of the first field of a frame. These two (2) bytes may be closed captioning data. The video encoder 625 can also be commanded to insert the second two (2) bytes onto the $21^{st}$ line of the vertical blanking interval of the second field of the frame.

Figure 3:
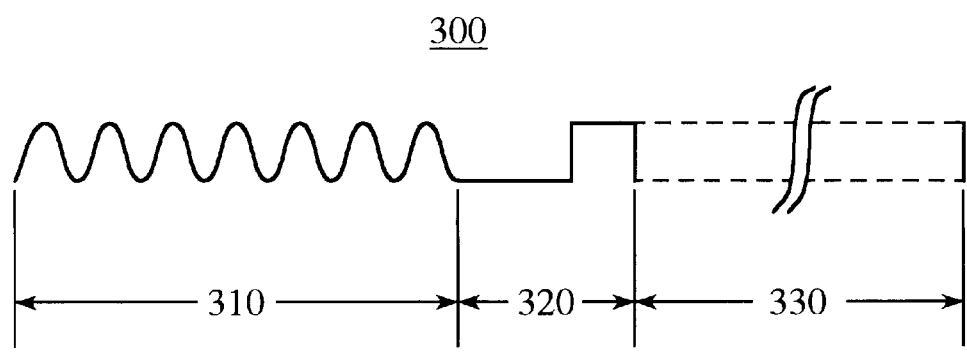
FIG. 3 illustrates the format of a closed captioning waveform.
Figure 6B:
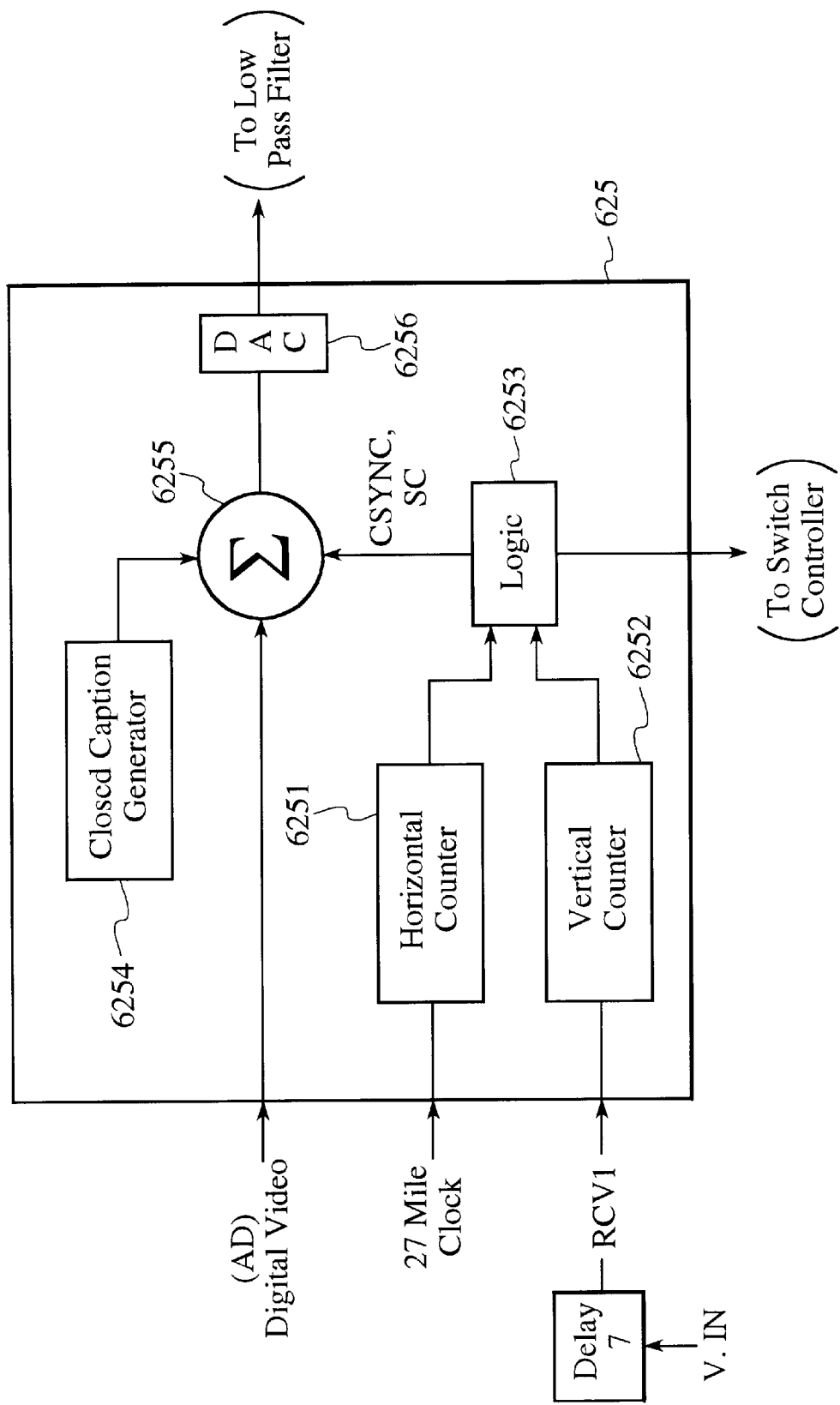

As shown in FIG. 6b, the video encoder 625 includes a closed caption generator 6254. The closed caption generator 6254 forms a closed caption waveform as shown in FIG. 3 by appending two (2) bytes of closed caption data to the seven (7) cycles of a sine wave 310 and the 0-0-1 sequence 320. The video encoder 625 then adds, by means of summing element 6255, the closed caption waveform from the closed caption generator 6254 to a decoded digital video from the MPEG video decoder 623. Specifically, the video encoder 625 adds the closed caption waveform during the $21^{st}$ line of the vertical blanking interval of the first field of a frame as determined by logic 6253 based on the horizontal and vertical counters 6251 and 6252, respectively.

The analog video signal output by the video encoder 625 may then be filtered by low pass filter 626, which smoothes the staircase characteristic of the signal from the digital to analog converter 6256 of the video encoder 625. The filtered analog video signal is then applied to a DC restore device 627 which clamps the black level of the filtered analog video signal to a predetermined voltage (e.g., zero volts) based on a reference voltage $V_{1,ref}$. The resulting analog video signal is then amplified by an amplifier 628, which is adjusted to zero out amplitude and offset errors caused by variations in nominal characteristics of the video encoder 655. The resulting analog video signal is then applied to an input 611 of the main video switch 610.

The video switch 610 switches one of the local advertisement video, applied to its first input 611, and the network program (national) video, applied to its second input 612, through to its output 613. The state of the video switch 610 is controlled by a switch control device 641. The switch control device 641 is, in turn controlled by the microprocessor 660, via a microprocessor bus 670. (Although the switch control device 641 and VBI multiplexer controller 640 are shown as being separate elements in FIG. 6a, their functions may be combined in a single device.)

As shown in FIG. 6a, cuetones provided on the network program signal feed are decoded by a cuetone decoding device 650, which applies control signals, based on the cuetones, to the microprocessor bus 670. As discussed above, a pre-roll cuetone for example, indicates that a break is about to start. The microprocessor 660 applies control signals to the switch control device 641, via the microprocessor bus 670, based on the decoded cuetones. Preferably, the switch between the network video feed and the advertisement video signal occurs during the vertical blanking interval (VBI) of the network video feed. The vertical blanking interval (VBI) can be determined by the logic 6253 of the video encoder 625 based on the counts of the horizontal and vertical counters 6251 and 6252, respectively. Thus, the state of the switch 610 is controlled based on the cuetones.

The switching of the audio signals from the advertisement signal and the program signal are similarly applied to an audio switch 633. The states of the audio and video switches 633 and 610, respectively, may be verified by switch verification devices 695 and 690, respectively.

Figure 1:
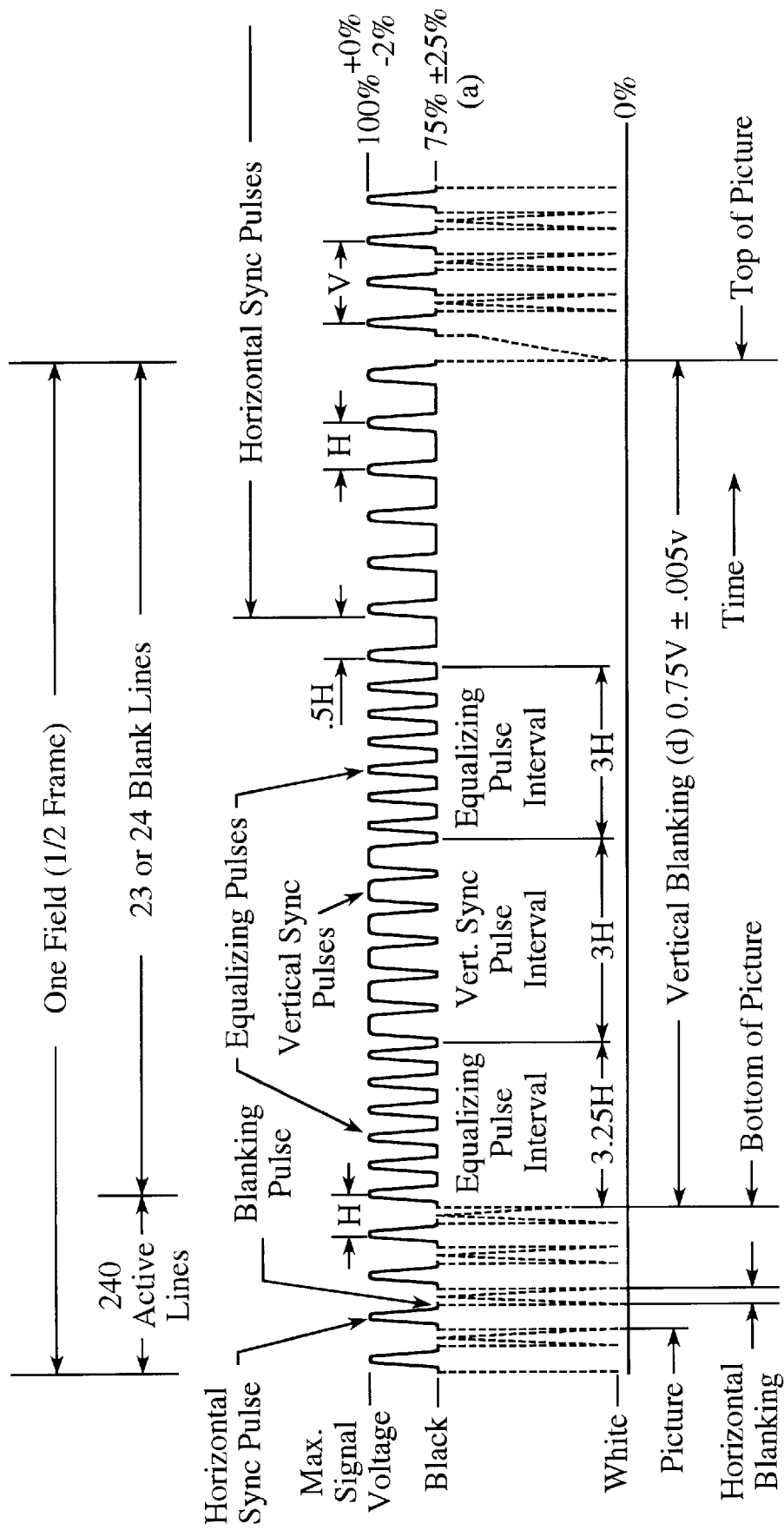
FIG. 1 illustrates an example of a field of a luminance signal of an NTSC video signal.
Figure 2:
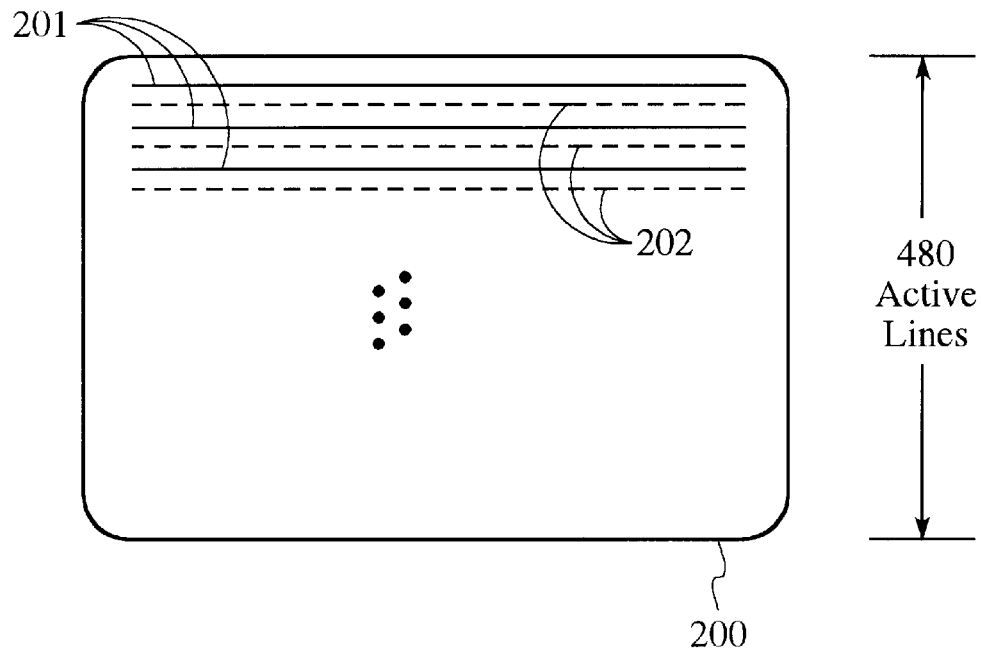
FIG. 2 illustrates the scanning of an NTSC (National Television Standards Committee) standard video signal by a television receiver.

The audio and video output of the switches 633 and 610, respectively, of the playback card 600 are provided to an associated channel modulator 410. The channel modulator 410 modulates the output of the playback card 600 with an RF carrier signal. Each channel modulator 410, 410', . . . , 410'' provides a carrier signal at a unique frequency and delivers a single, narrowband analog signal, serving as one of n channels, to a channel combiner 420. The channel combiner 420 combines the narrowband analog signals into a broadband signal offered by the local cable provider. A cable distribution network 430 brings this broadband signal to subscribers (e.g., subscriber 440). Each subscriber 440 includes a decoder 441 for extracting a narrowband analog signal, corresponding to a selected channel, from the received broadband signal. A receiver 442 displays the video data and plays the audio data included in the narrowband analog signal provided by the decoder (441) as described above with reference to FIG. 2.

Data to be inserted during one or more lines of a vertical blanking interval may be acquired and processed in at least one of the following three ways. In the first way of acquiring and processing VBI insertion data, the data may be provided as private data packets in the MPEG transport stream provided to the FIFO buffer 620 as an advertisement. (Alternatively, the private data may be stored elsewhere in the transport stream. For example, as defined in Annex H of the Generic Coding of Moving Pictures and Associated Audio Information: Systems, by the International Organization for Standardization and International Electrotechnical Commission (ISO/ICE 138181-1, International Telecommunications Union Telecommunications Standardization Sector (ITU-T) Rec. H.222.0, p. 124 (1995) the transport stream includes various locations for the insertion of private data). As discussed above, these private data packets are identified with a packetized identifier (or PID) and are stored in the "3" queue (or in any one of queues "4" through "15") by the transport demultiplexer 621. In the present invention, the queue is embodied as a circular buffer in the DRAM 622.

As discussed above, the microprocessor 660 is programmed to check the location of the pointer of the "3"

queue to determine whether or not new data has been acquired. As programmed, if the microprocessor 660 determines that the pointer of the circular queue has changed, and therefore, that new data has been acquired, it will read out the contents of the "3" queue. The microprocessor 660 is programmed to then provide this private data to a VBI generator 645 via the microprocessor bus 670.

The VBI generator 645 buffers the private data, appends it to an appropriate waveform to form a VBI insertion data, and applies the VBI insertion data to an input of the VBI multiplexer 624. For example, the appropriate waveform may be similar to the seven (7) cycles of a sine wave 310 and the 0-0-1 sequence 320 of the closed caption waveform 300. However, the amplitude of the waveform is preferably larger. The VBI insertion data may be adapted to other formats. If the VBI insertion data is to be inserted on more than one line of the vertical blanking interval and if there is not much phase drift in the coaxial cable distribution network, lines of VBI data following the first line of VBI data can dispense with the seven (7) cycles of a sine wave, thereby permitting more VBI insertion data to be transferred per line. Dispensing with the seven (7) cycles of a sine wave when phase drift is limited is possible because the purpose of the seven (7) cycles of a sine wave is to permit a decoder to lock onto the phase of the appended data such that digital data is read at its middle, away from any leading or falling edges. Thus, if phase drift is limited, the initial seven (7) cycles of a sine wave of the first line of VBI insertion data will suffice to permit a decoder to accurately decode subsequent lines of VBI insertion data.

The VBI insertion data is then provided, via the VBI multiplexer 624, to the video encoder 625 during one or more lines of the vertical blanking interval of the decoded MPEG video signal (as encoded by the video encoder 625). The VBI multiplexer 624 switches through the VBI insertion data rather than the decoded MPEG video signal based on a control signal from the logic 6253 of the video encoder 625. The control signal is generated by the logic 6253 of the video encoder 625 based on the count of the horizontal counter 6251. The horizontal counter counts 27 MHz clock pulses and is reset when it reaches 1716 (1716 is the number of 27 MHz clock pulses per line under the NTSC Standard). The vertical counter 6252 is incremented each time the horizontal counter 6251 is reset and is reset when a vertical synch pulse is identified by the synch strip device 603. As shown in FIGS. 6a and 6b, the synch strip device 603 provides the V_IN signal to the video encoder 625. Thus, the count of the vertical counter 6252 is directly related to the line number of a field of a frame and therefore can be used to indicate the start of the vertical blanking interval and the end of the vertical blanking interval. The logic 6253 will provide a control signal(s) to the VBI multiplexer 640 during at least one line of the $10^{th}$ through $20^{th}$ line of the vertical blanking interval as determined by the count of the vertical counter 6252.

The VBI insertion data inserted on the vertical blanking interval may be read and/or decoded by an appropriate device at a subscriber's residence. The architecture or operation of the decoder will be dictated by the format and location of the VBI insertion data. The decoder may provide additional textual information related to the commercial being received, for example.

The second way of acquiring and processing VBI insertion data is designed for inserting advertisement verification data. As discussed in the background section above, advertisers (sponsors) will want to verify that their advertisements were properly transmitted, in their entirety, by the cable head end at the appropriate time, on the appropriate channel. A commercial identification (CID) number is provided in a private data packet of the MPEG transport stream. The private data packet is preferably provided on the MPEG transport stream at the beginning of a file. As discussed here, a "file" is defined as a single commercial or a single program. For example, a two (2) minute program break may include four (4) 30 second commercials, or, four (4) files. Each of the four (4) files has a private data packet at its front end. Similar to VBI insertion data discussed above, the commercial identification (CID) number data is identified as a private data packet with a packetized identifier (PID) and stored in a corresponding queue by the transport demultiplexer 621. The microprocessor 660 is programmed to check the pointer of the queue to determine whether or not new data has been acquired. As programmed, if the microprocessor 660 determines that the pointer of the circular queue has changed, and therefore that new data has been acquired, it will read out the contents of the queue. The microprocessor 660 is programmed to then provide the CID number to the VBI generator 645.

Figure 7:
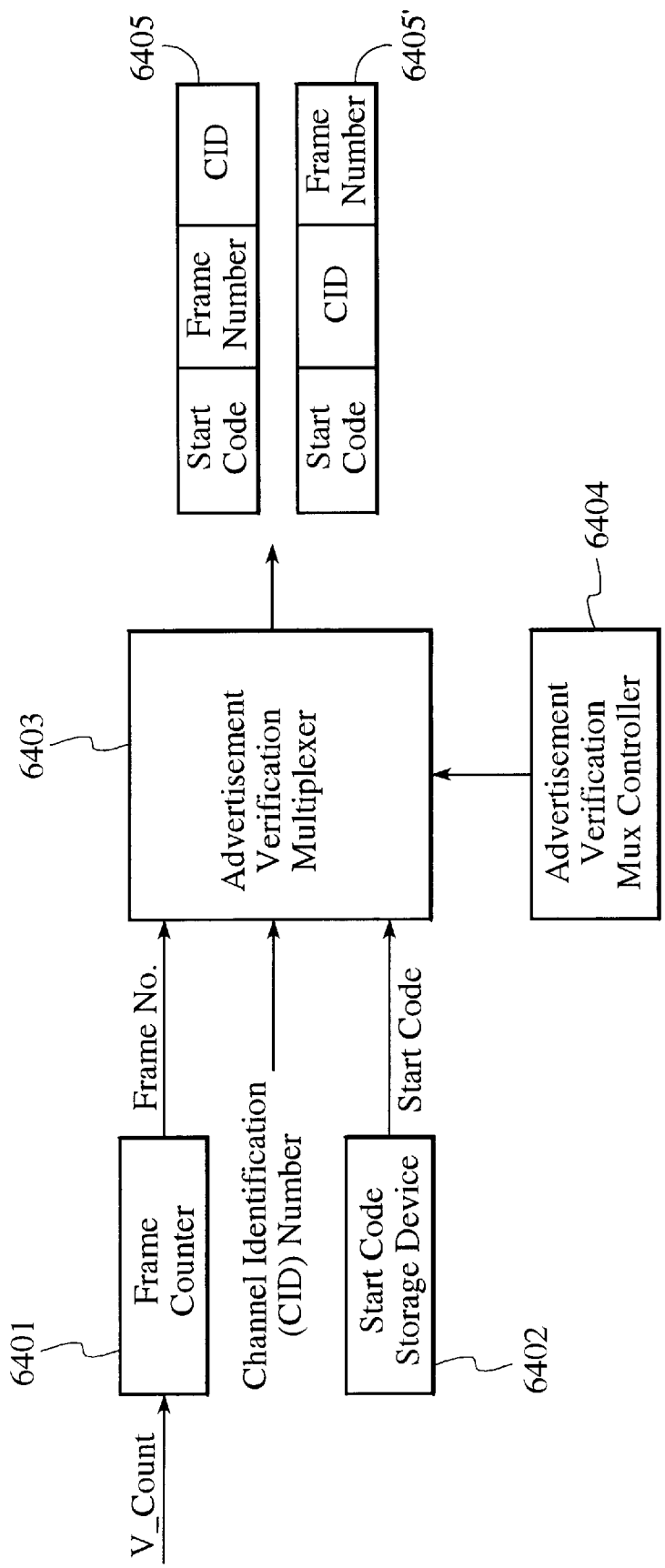
FIG. 7 is a block schematic of the device for generating add verification information in accordance with the present invention.

As shown in FIG. 7, in a preferred embodiment of the present invention, the VBI generator 645 concatenates the CID number with a frame count number provided by a counter and adds a start code from a start code storage device 6402 (or alternatively, provided by microprocessor 660) which identifies the data as ad verification data. The frame counter 6401 is incremented with each new frame of the commercial based on when the V_Count of vertical counter 6252 is reset. Each frame corresponds to two fields of the commercial, and each field is indicated by a group of (e.g., six (6)) vertical synchronization pulses. Accordingly, the counter 6401 may be alternatively incremented every two groups of (e.g., twelve (12)) vertical synchronization pulses. In this embodiment, the VBI generator 640 includes a multiplexer 6403 for time multiplexing the frame number, the CID number, and the start code under the control of the mux controller 6404. The output of the multiplexer 6403 will have a format as shown by element 6405 or 6405'.

Alternatively, the commercial identification (CID) number, and preferably the frame count, can be written into the third and fourth bytes of the buffer of the SAA7185A video encoder 625 described above. The video encoder 625 can then be commanded to insert these two (2) bytes of ad verification data onto the $21^{st}$ line of the vertical blanking interval of the second field of a frame. Recall that closed caption data may be inserted onto the $21^{st}$ line of the vertical blanking interval of the first field of a frame.

A specially designed decoder, located at a random location on the coaxial cable distribution network, can verify the transmission of an advertisement from an advertisement transmitted with such ad verification data. Specifically, during the vertical blanking interval of the received video signal, the decoder determines whether the ad verification start code exists. If the ad verification start code is found, the decoder strips the commercial identification (CID) number from the frame count number. The decoder may include a look-up table which matches the commercial identification (CID) number with a particular commercial. The data in the look-up table may be periodically downloaded from a remote source. That the proper commercial was transmitted at the proper time, in its entirety, can be verified by checking the commercial identification (CID) number and by checking whether the requisite number of frames of the commercial were transmitted.

Figure 9:
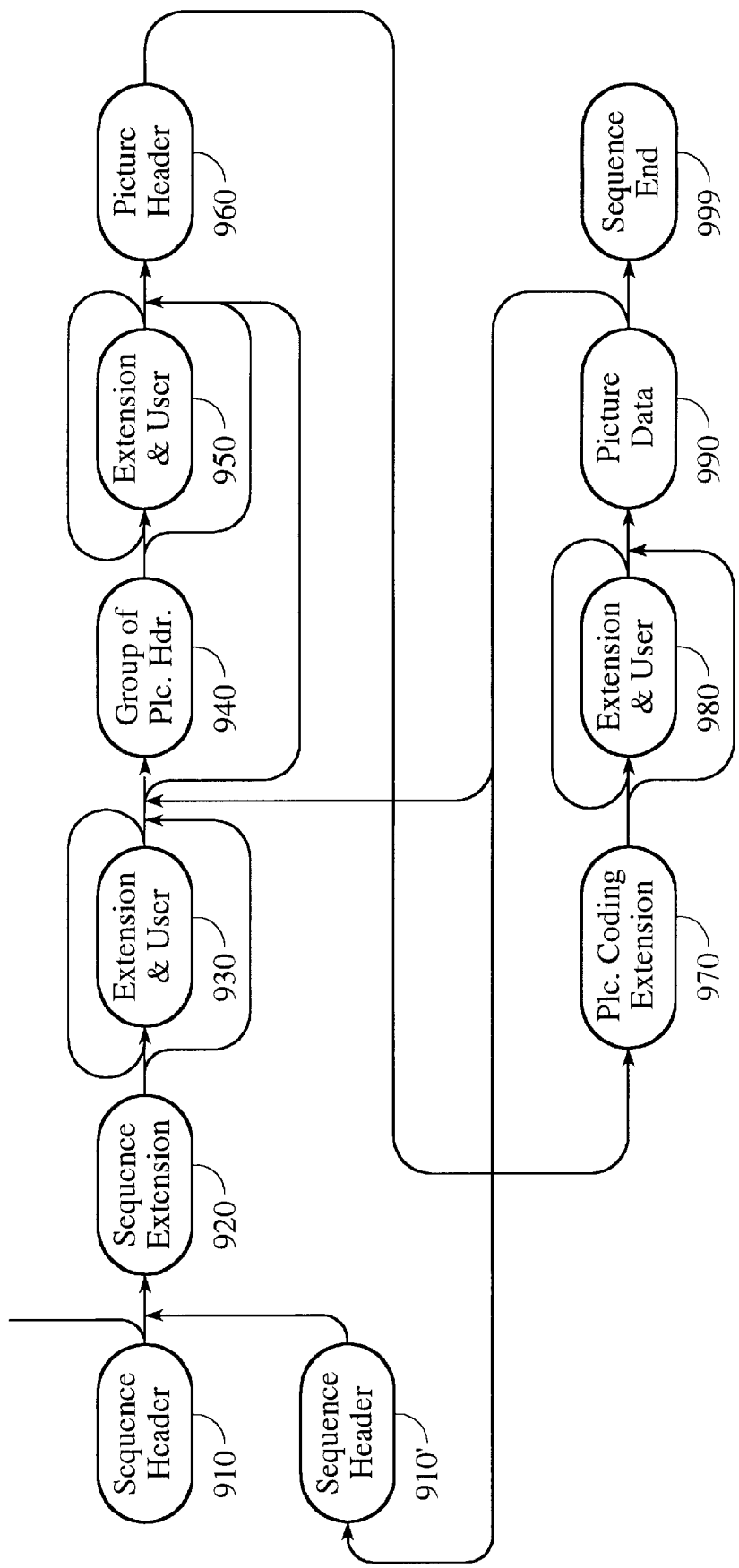
FIG. 9 is a diagram which illustrates the high level video bitstream organization in accordance with MPEG video standard.

The third way of acquiring and processing VBI insertion data is by inserting it in the "extension and user" video bitstream element of an MPEG video bitstream. The present invention uses this video bitstream element to transport closed caption data, for example. Alternatively, private or user defined data may be inserted in the "extension and user" video bitstream element of an MPEG video bitstream. FIG. 9 illustrates a high level video bitstream organization in accordance with the MPEG video standard. As shown in FIG. 9, a sequence header video bitstream element 910, is followed by a sequence extension video bitstream element 920. The sequence extension video bitstream element 920 may be followed by an extension and user video bitstream element 930 or by a group of picture header video bitstream element 940. If an extension and user video bitstream element 930 exists, it is followed by the group of picture header video bitstream element 940. The group of picture header video bitstream element 940 may be followed by a second extension and user video bitstream element 950 or by a picture header video bitstream element 960. If the second extension and user video bitstream element 950 exists, it is followed by the picture header video bitstream element 960. The picture header video bitstream element 960 is then followed by a picture coding extension video bitstream element 970. The picture coding extension video bitstream element 970 may be followed by a third extension and user video bitstream element 980 or a picture data video bitstream element 990. If the third extension and user video bitstream element 980 exists, it is followed by the picture data video bitstream element 990. Finally, as shown in FIG. 9, the picture data video bitstream element 990 is followed either by a sequence end video bitstream element 999, or by a next sequence header video bitstream element 910'. Each type of video bitstream element has a unique start code which identifies it as a certain type of video bitstream element.

The sequence header video bitstream element 910, 910' includes codes which facilitate the identification of the horizontal size of the picture data, the vertical size of the picture data, the aspect ratio of the picture data, the frame rate of the picture data, and the bit rate of the picture data. The sequence extension video bitstream element 920 includes codes which facilitate the identification of the chroma format of the picture data, the horizontal and vertical size of the picture data (the most significant bits to be concatenated with codes from the sequence header video bitstream element 910, 910'), and the bit rate of the picture data (the most significant bits to be concatenated with codes from the sequence header video bitstream element 910, 910'). The group of pictures header video bitstream element 940 includes a code for timing and control for video tape recorders and a code for determining the nature of predictions used in the encoding of the picture data. The picture header video bitstream element 950 includes codes regarding the type of coding used in the encoding of the picture data. The picture coding extension video bitstream element 960 includes codes which facilitate the decoding of the picture data.

The extension and user video bitstream elements 930, 950, 980 may include data defined by users for their specific applications. For example, in the device of the present invention, closed captioning data is provided in the third extension and user video bitstream element 980. The closed caption data is formatted as two (2) bytes (See e.g., element 330 of FIG. 3.) or groups of two (2) bytes. Since the extension and user video bitstream element 980 is identified as video by its packet identification (PID)(Q=0), the transport demultiplexer 621 provides it to the MPEG video decoder 623 as discussed above.

If the extension and user video bitstream element 930, 950, 980 includes user data, it will include a bit string to identify the beginning of such user data. For example, under the MPEG video standard, a user_data_start_code bit string is defined as 000001B2 hexadecimal. The user_data_start_code is followed by a user_data field. The first few bits of the user_data field are used to identify the data in it as closed caption data. Again, other types of data may be included in the user_data field, in which case, the first few bits of the user_data field are used to identify the type of data following them. However, in the embodiment of the present invention, only the third extension and user video bitstream element 980 (i.e., the extension and user video bitstream element following the picture coding extension video bitstream element 970) contains closed caption data. Therefore, as programmed, after the MPEG video decoder 623 decodes the picture coding extension video bitstream element 970, it searches for the user_data_start_code bit string (e.g., 000001B2 hexadecimal) associated with the extension and user video bitstream element 980. If the user_data_start_code bit string is found, the MPEG decoder 623 (as programmed) will store the concatenated user data in a storage device, such as a FIFO buffer for example. The MPEG decoder 623 (as programmed) will also communicate the existence of private data to the microprocessor 660. The microprocessor 660 is programmed to then read the user data from the storage device of the MPEG decoder 623 via the microprocessor bus 670. The microprocessor 660 (as programmed) can identify the data in the user_data field as closed caption data (or as another user defined type of data) by means of the first few bits of the user_data field. The microprocessor 660 (as programmed) then provides the closed caption data to the video encoder 625 via the microprocessor bus 670. If the SAA7185A video encoder 625 is used, the closed caption data is provided to the first two (2) bytes of its four (4) byte buffer. Alternatively, the closed caption data may be provided to the VBI generator 645.

Thus, the device of the present invention permits private data, ad verification data, and closed caption data to be inserted on one or more vertical blanking intervals of a video signal conforming with the NTSC standard.

What is claimed is:

1. A device for extracting private data from an MPEG transport stream and inserting the private data on at least one line of a vertical blanking interval of a video signal, the device comprising:

a) a processor operating under a stored control program;
 b) a bus coupled with the processor;
 c) a buffer having an input receiving the MPEG transport stream and an output;
 d) a transport demultiplexer having an input coupled with the output of the buffer, an input/output port coupled with the bus, an associated storage device having a plurality of queues, and an output, the transport demultiplexer adapted to
 i) separate the MPEG transport stream into elementary streams based on packetized identification numbers included in headers of the elementary streams,
 ii) route the elementary streams to the plurality of queues based on the packetized identification numbers, and
 iii) provide video elementary streams to its output;
 e) a video decoder having an input coupled with the output of the transport demultiplexer, having an input/output port coupled with the bus, having an associated storage device for storing frames of the video elementary stream, and having an output, the video decoder adapted to
    i) convert the MPEG video elementary streams to a digital video signal, and
    ii) provide the digital video signal to its output;
f) a multiplexer having a first input coupled with the output of the video decoder, a second input, a control input, and an output;
g) a video encoder having a first input coupled with the output of the multiplexer, a second input provided with video synchronization pulses, and a first output and a second output, the video encoder adapted to
    i) encode a digital video signal provided at its first input to a formatted video signal based on the video synchronization pulses provided at its second input,
    ii) converting the formatted video signal into an analog video signal,
    iii) providing the analog video signal to its first output,
    iv) determining a count indicative of a horizontal line of a video field of a video frame of the analog video signal, and
    v) providing the count to its second output;
h) a vertical blanking interval data generator having a port coupled with the bus, and an output coupled with the second input of the multiplexer, the vertical blanking interval data generator adapted to
    i) format data provided at its port to form formatted data, and
    ii) provide the formatted data to its output;
i) a multiplexer controller having an input coupled with the second output of the video encoder, and an output coupled with the control input of the multiplexer, the multiplexer controller adapted to
    i) determine an occurrence of the at least one line of a vertical blanking interval of the analog signal based on data provided at its input; and
    ii) providing a switching signal to the multiplexer based on the determined occurrence of the at least one line of the vertical blanking interval.

2. The device of claim 1 wherein each of the plurality of queues of the storage device of the transport demultiplexer has an associated pointer, and
    wherein the processor is programmed to:
        i) check the location of the pointer of one of the plurality of queues at least two times to determine if new data has been stored in the one of the plurality of queues;
        ii) extract the new data from the one of the plurality of queues if new data has been determined to exist; and
        iii) provide the new data extracted from the one of the plurality of queues to the port of the vertical blanking interval data generator via the bus.

3. The device of claim 2 wherein the formatted data formed by the vertical blanking interval data generator includes a code which identifies a particular commercial and a frame count number.

4. The device of claim 1 wherein the video decoder is programmed to:
    i) search for an extension and user video bitstream element in the video elementary stream; and
    ii) inform the processor if an extension and user video bitstream element is found in the video elementary stream, and
wherein, if the processor is informed that an extension and user video bitstream element is found in the video elementary stream, the processor is programmed to provide data contained within the extension and user video bitstream element to the vertical blanking interval data generator.

5. The device of claim 4 wherein the data is closed captioning data.

6. The device of claim 1 wherein the video encoder includes a register for storing data to be inserted on one line of the vertical blanking interval during a first field of a frame of the video signal,
    wherein the video decoder is programmed to:
        i) search for an extension and user video bitstream element in the video elementary stream; and
        ii) inform the processor if an extension and user video bitstream element is found in the video elementary stream, and
wherein, if the processor is informed that an extension and user video bitstream element is found in the video elementary stream, the processor is programmed to provide data contained within the extension and user video bitstream element to the register of the video encoder.

7. The device of claim 6 wherein the data is closed captioning data.

8. The device of claim 7 wherein the one line of the vertical blanking interval is the $21^{st}$ line.

* * * * *